Figure 1:
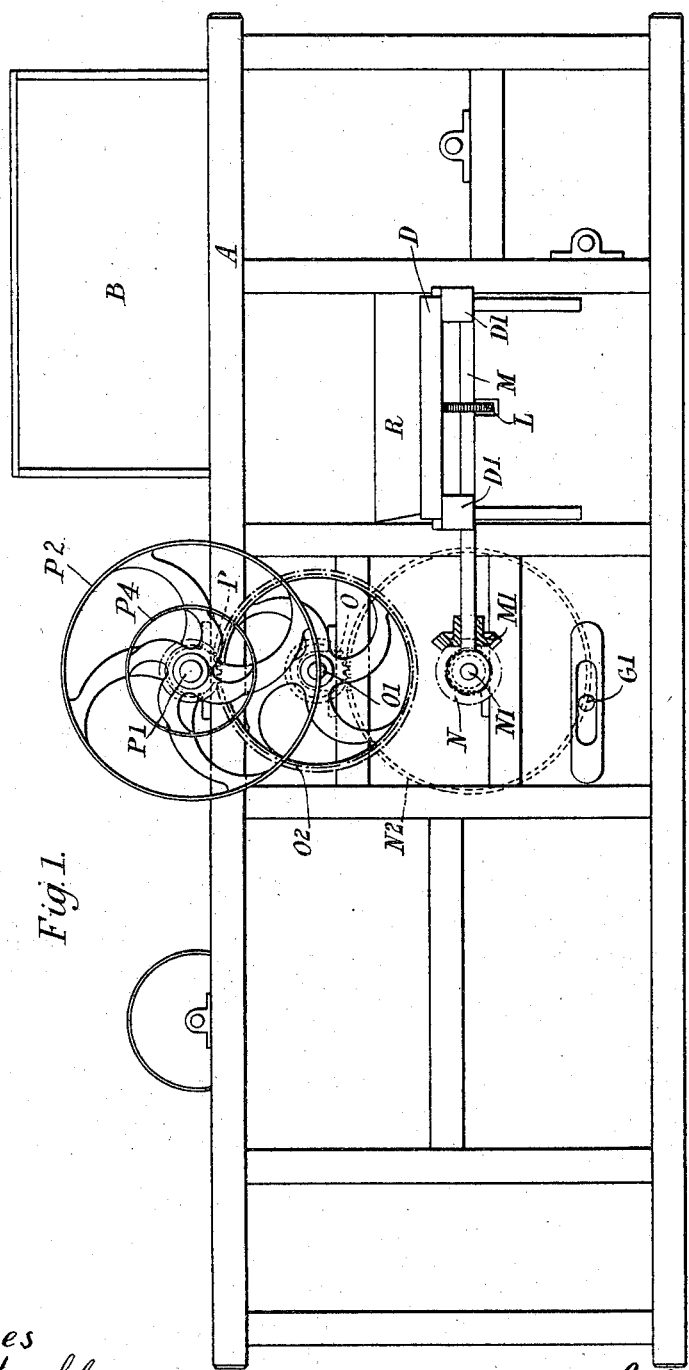

(No Model.) 5 Sheets—Sheet 1.
G. CARLSON & G. S. BAKER.
CONFECTIONERY MACHINE.

No. 598,592. Patented Feb. 8, 1898.

Witnesses
A. U. Opsahl.
C. F. Kilgore

Inventors
Gabriel Carlson
George Samuel Baker
By their Attorney
Jas. F. Williamson (No Model.) 5 Sheets—Sheet 2.

G. CARLSON & G. S. BAKER.
CONFECTIONERY MACHINE.

No. 598,592. Patented Feb. 8, 1898.

Witnesses.
A. H. Opsahl.
C. F. Kilgon.

Inventors
Gabriel Carlson
George Samuel Baker
By their Attorney
Jas. F. Williamson (No Model.) 5 Sheets—Sheet 4.

G. CARLSON & G. S. BAKER.
CONFECTIONERY MACHINE.

No. 598,592. Patented Feb. 8, 1898.

Witnesses
A. H. Opsahl
C. F. Klegin

Inventors
Gabriel Carlson
George Samuel Baker
By their Attorney
Jas. F. Williamson (No Model.) 5 Sheets—Sheet 5.

G. CARLSON & G. S. BAKER.
CONFECTIONERY MACHINE.

No. 598,592. Patented Feb. 8, 1898.

Witnesses
A. U. Opsahl
C. F. Kilgore

Inventors
Gabriel Carlson
George Samuel Baker
By their Attorney
Jas. F. Williamson

UNITED STATES PATENT OFFICE.

GABRIEL CARLSON, OF SPRINGFIELD, MASSACHUSETTS, AND GEORGE SAMUEL BAKER, OF LONDON, ENGLAND.

CONFECTIONERY-MACHINE.

SPECIFICATION forming part of Letters Patent No. 598,592, dated February 8, 1898.

Application filed June 29, 1897. Serial No. 642,883. (No model.)

*To all whom it may concern:*

Be it known that we, GABRIEL CARLSON, a citizen of the United States, residing at Springfield, in the county of Hampden and State of Massachusetts, and GEORGE SAMUEL BAKER, a subject of the Queen of England, residing at London, England, have invented certain new and useful Improvements in Machines for Use in the Manufacture of Confectionery; and we do hereby declare the following to be a full, clear, and exact description of the invention, such as will enable others skilled in the art to which it appertains to make and use the same.

This invention relates to machines of the kind described in the United States Patent No. 527,662, granted to Gabriel Carlson on October 16, 1894, and the British Patent to said Carlson, No. 20,789, of 1894, for use in the manufacture of confectionery, its object being the construction of apparatus which, while operating to scour and clean the confectionery and separate the molding material therefrom in the manner described in the aforesaid prior patents, is provided, according to the present invention, with improved means for picking up the molding material, recharging the molding-trays therewith, and for imparting the desired finish to the recharged trays.

According to this invention suitable rails or the like upon which the molding-trays may travel are arranged transverse to the machine beneath the opening in the top of the machine through which the confectionery and molding material is delivered. A portion of the latter falls into the trays, while some descends to a platform beneath the trays, whence it is raised in a manner to be hereinafter described.

A conveyer, which may conveniently be constructed of an endless chain provided with transverse slats, passes over the surface of the trays and along the platform beneath in such a manner that the molding material is pushed along the platform beneath the trays and up an inclined surface and deposited in the trays. In order to prevent the material falling from between the slats before it has reached a point properly over the transverse trays, a sheet of iron or other suitable material is arranged in a horizontal plane just above the upper surface of the trays and below the contiguous portion of the conveyer, so that the molding material, after reaching the top of the inclined plane up which it is being conveyed, is moved onto this sheet by the conveyer. This sheet, instead of stopping directly over and parallel to the edge of the trays, is cut diagonally or in a curve, so that the molding material drops over this slanting edge over the whole width of the tray, by which means the trays are more satisfactorily and evenly charged in the corners, as well as in the other parts of the tray, than would result if the edge of the sheet ceased at a line parallel to the direction of travel of the trays.

The close contact of the filling slats or conveyers with the trays which are being filled causes these slats also to perform the work of continuously striking or leveling the molding material, and by means of the contact of the slats or conveyers with the trays over which they move crosswise while both are in motion a diagonal movement is given to the material as it fills into the trays, thereby effecting the filling of the trays in the most regular and satisfactory manner.

In the machine at the place where the charged trays issue is hung a plate arranged slightly diagonally and in such a manner that its lowest edge scrapes the upper surface of the trays and smooths off the molding material, though this process has already been more or less perfectly performed by the slats or conveyers or the horizontal iron sheet previously described.

The arrangement of the sieves and cleaning devices for treatment of confectionery can be substantially as described in the above-mentioned prior Carlson patents.

The wheels over which the conveyer passes are preferably four in number, though more or fewer than this may be employed, if desired.

With regard to the gearing employed to move the trays through the machine for recharging and for operating the conveyer it may conveniently comprise two shafts at right angles to each other, one operating the trays and the other the conveyer. These shafts are geared together by suitable toothed gearing and one or other of them is connected by other gear to the main driving-shaft of the apparatus, the ratio of the gearing being such that the angular velocity of the driven shafts is suitably reduced relatively to that of the driving-shaft upon which the usual fast and loose pulleys may be placed.

Figure 2:
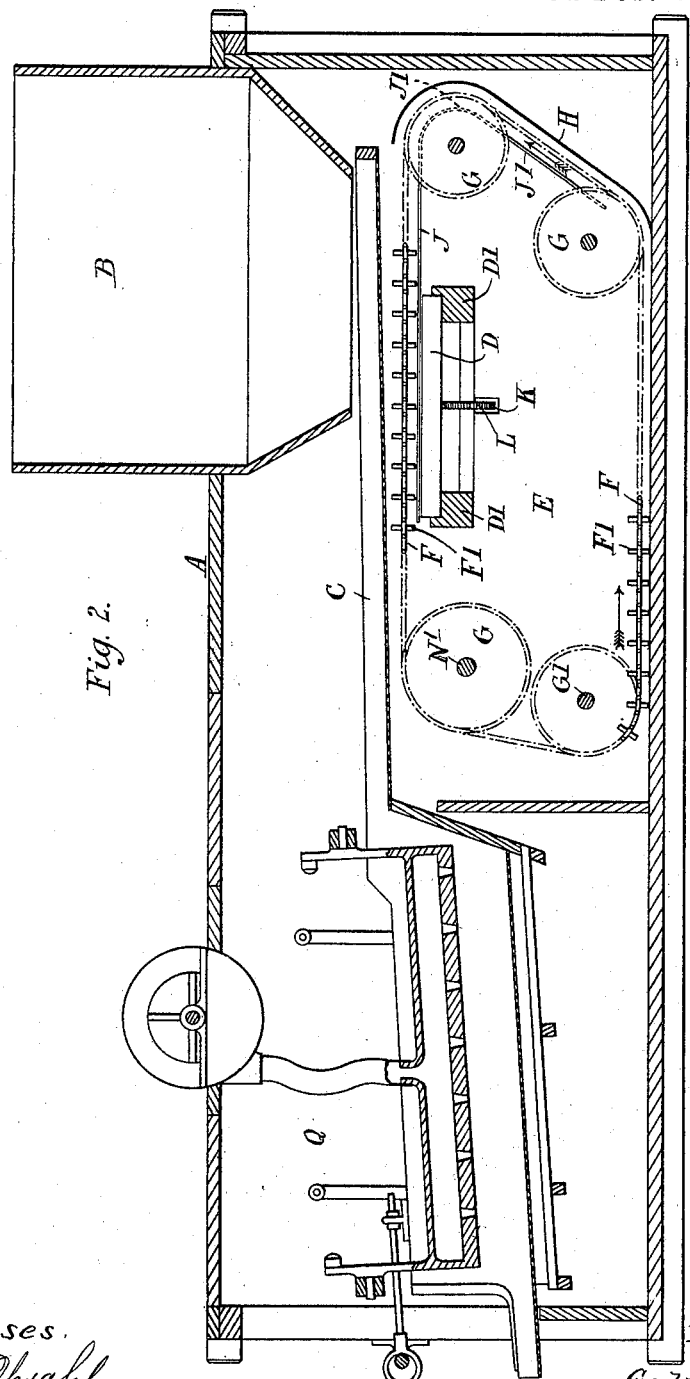
Figure 3:
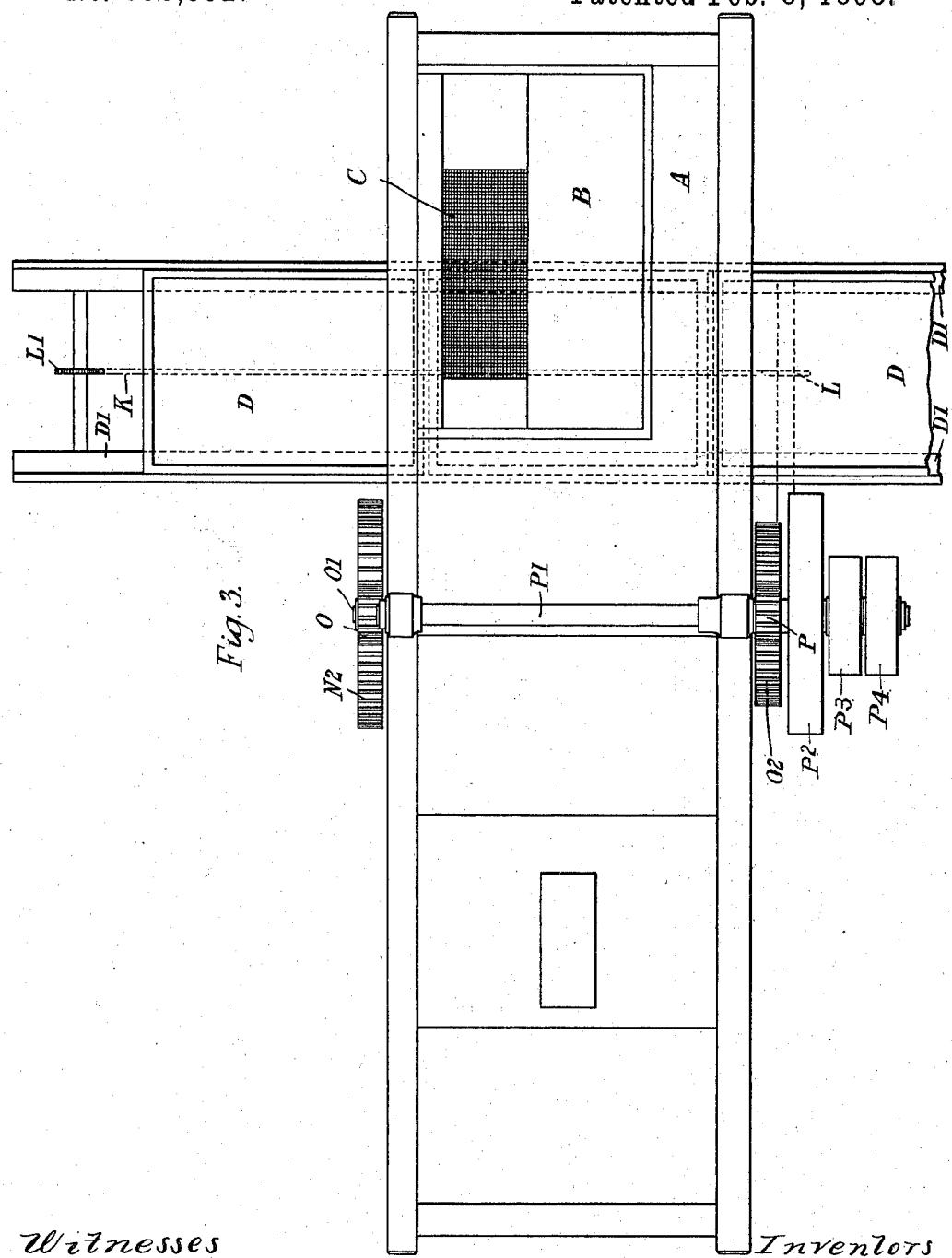
Figure 4:
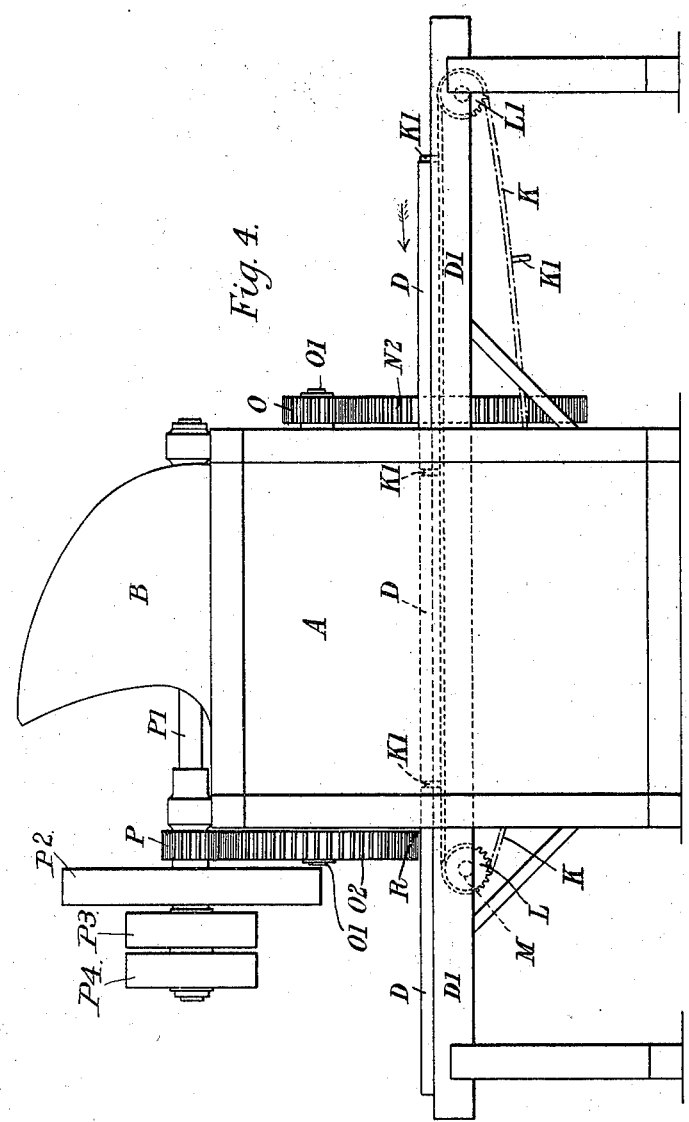
Figure 5:
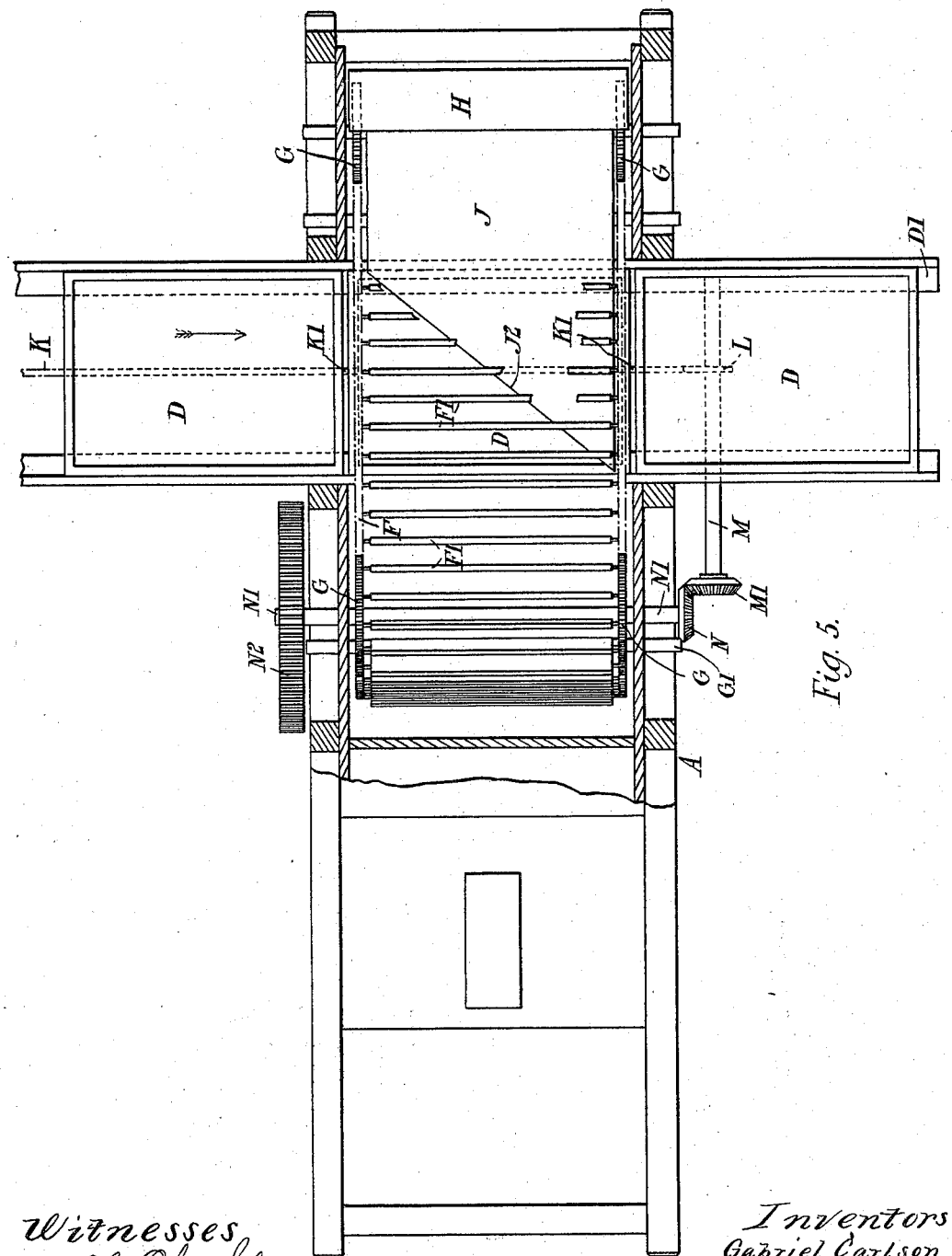

In the accompanying drawings, Figure 1 is a side elevation of the improved machine. Fig. 2 is a longitudinal vertical section of the same. Fig. 3 is a plan. Fig. 4 is an end elevation. Fig. 5 is a view, partly in plan and partly in horizontal section, showing the interior of the machine, some parts being broken away.

Like letters indicate like parts throughout the drawings.

On the top of the casing A is arranged a hopper B, through which the starch and confectionery are fed into the machine. Beneath this hopper is arranged an oscillating sieve C, as in the above-mentioned prior patents. A portion of the material passing through the sieve C falls directly into the molding-trays D, which latter are fed successively through the machine in a transverse direction. The remainder of the starch falls into the receptacle E in the bottom of the machine, whence it is carried up by a conveyer F onto a "disposing-plate" J, arranged over the trays D, into which it is fed.

The conveyer comprises slats $F'$, which are attached at each end to two chains F, which run over, preferably, four pairs of chain-wheels G, arranged on suitable shafts. Three of the shafts of these chain-wheels run in fixed bearings. The fourth, G, rests, however, in an adjustable bearing by means of which the slack of the chains may be taken up. A sloping board or metal sheet H is arranged transversely across the receptacle E. The upper part of this board or sheet H is carried over the upper chain-wheels at that end. The whole board H is arranged in such proximity to the slats $F'$ of the conveyer that as the chain-wheels rotate the slats draw the material in the direction indicated by the arrows along the bottom of the receptacle E and up the inclined surface of the board H. The disposing-plate J, preferably formed of a metal plate, is arranged in a position so as to lie just over the top of the tray D as it passes through the machine. This plate J stretches across the machine and at one end, $J'$, is curved down against the inner surface of the conveying-slats. The other end, $J^2$, of this plate J is cut at an angle, as shown in Fig. 5, this slanting portion leaving a triangular-shaped opening above the trays D, through which opening the material as it is drawn over the plate J by the slats of the conveyer F is fed into the trays. The effect of this diagonally-cut plate is that the material is evenly disposed all across the trays.

The trays D are fed through the machine by means of an endless chain K, carrying fingers $K'$ and running over chain-wheels L $L'$, motion being imparted to the former of these wheels through the shaft M, at one end of which it is mounted, the other end of the shaft carrying a bevel-wheel $M'$, which gears with another bevel-wheel N upon a shaft $N'$, arranged transversely to the machine. This shaft $N'$ is that which also carries two of the chain-wheels G and on the other end of the shaft at the opposite side of the machine a large gear-wheel $N^2$. This wheel gears with a pinion O upon a shaft $O'$, which carries at its other end a large gear-wheel $O^2$, this latter gear-wheel in turn engaging with a pinion P upon a shaft $P'$, which carries a fly-wheel $P^2$ and fast and loose pulleys $P^3$ $P^4$. It will be seen that by this arrangement motion is imparted to the conveyer F and to the trays D at a speed sufficiently reduced for the requirements of filling up the latter. The trays D run upon, preferably, wooden rails $D'$, arranged across the machine and projecting on either side sufficiently to allow of one or more trays resting on them at either side of the machine, the empty trays being fed in at the right-hand side of the machine, as seen in Fig. 4, the charged trays being removed through the left-hand side.

By arranging the disposing-plate J sufficiently close to the top of the trays D a smooth or more or less finished appearance is imparted to the surface of the molding material; but, if desired, a further finishing may be given to the surface by a plate R, hung loosely from the casing of the machine over the opening through which the charged trays issue, this plate R being so adjusted that its lower edge may scrape over the top of the trays and remove the surplus material.

If desired, instead of the edge $J^2$ of the plate J being cut at an angle, as shown in Fig. 5, it may be curved or otherwise suitably shaped, in order to cause the molding material to be fed uniformly across the whole width of the trays D. It will thus be seen that the trays, in addition to being filled by means of the conveyer-slats, have the surface of the starch deposited in them struck off or leveled first by these slats, then by the plate J, and lastly by the plate R.

The starch, which is the molding material usually employed in these machines, is not easy to manipulate, but it is found that by means of conveying-slats moving across the trays and close to the upper surfaces of the latter, with a disposing-plate arranged in the manner above described, the molding-trays may be satisfactorily filled.

The cleaning apparatus at the delivery end Q of the machine has not been described in detail for the reason that the same is substantially identical with the cleaning apparatus fully described in said two prior patents to Gabriel Carlson, hereinbefore identified.

What we claim, and desire to secure by Letters Patent of the United States, is as follows:

1. In a machine for use in the manufacture of confectionery, the combination with a suitable guideway through which the molding-trays are fed, of a disposing-plate overlying said guideway, and a conveyer adapted to move the molding material on the face of said disposing-plate transversely to the travel of the trays in their guideway, with said disposing-plate formed to afford a supply or feed passage to said trays, which passage decreases in the direction of the travel of the tray, substantially as described.

2. In a machine for the manufacture of confectionery, the combination with a suitable guideway, through which the molding-trays are fed, of a triangular disposing-plate overlying said guideway, and a conveyer adapted to move the molding material on said disposing-plate transversely to the travel of the trays in their guideway, with said triangular disposing-plate arranged to afford a decreasing feed-passage to said trays, in the direction of their travel, for charging the trays, under the coöperation of said conveyer, substantially as described.

3. In a machine for use in the manufacture of confectionery, the combination with a suitable guideway through which the molding-trays are fed, of a feed-hopper above said guideway, a receptacle below said guideway, a disposing-plate overlying said guideway, and a conveyer arranged to travel through said receptacle and over the face of said disposing-plate, with said disposing-plate formed to afford a supply or feed passage to said trays, which passage decreases in the direction of the travel of the tray, substantially as and for the purposes set forth.

4. In a machine for use in the manufacture of confectionery, the combination with a suitable guideway through which the molding-trays are fed, of a disposing-plate overlying said guideway with its under edge on a level with the top of the charged tray, and a conveyer having slats or equivalent striking and conveying surfaces mounted to move over the face of said disposing-plate, with said disposing-plate formed to afford a supply or feed passage to said trays, which passage decreases in the direction of the travel of the tray, whereby, under the coöperation of said disposing-plate and conveyer, the trays may be evenly charged with the molding material, substantially as described.

5. In a machine for the manufacture of confectionery, the combination with a suitable guideway, through which the molding-trays are fed, of a feed-hopper above said guideway, a receptacle below said guideway, a traveling conveyer having transverse slats, a disposing-plate overlying said guideway, with its lower edge on a level with the top of the properly-charged tray, with said disposing-plate formed to afford a feed-passage to the trays, increasing in the direction of the tray's travel, and with said conveyer mounted to travel through said receptacle and over the face of said disposing-plate, for coöperation therewith, substantially as described.

6. In a machine for the manufacture of confectionery, the combination with a suitable guideway for the trays, of a continuous feed device for said trays, a disposing-plate overlying said guideway and a conveyer adapted to move the molding material on the face of said disposing-plate transversely to the travel of the trays in their guideway, with said disposing-plate formed to afford a supply or feed passage to said trays, which passage decreases in the direction of the travel of the tray, substantially as described.

7. In a machine for use in the manufacture of confectionery, the combination with a suitable guideway through which the molding-trays are fed, of a feed-hopper above said guideway, a receptacle below said guideway, a disposing-plate overlying said guideway, a sieve between said feed-hopper and said disposing-plate, and a conveyer having transverse slats mounted to travel through said receptacle and over the face of said disposing-plate transversely of the tray-guideway, with said disposing-plate formed to afford a feed-passage to the trays, decreasing in the direction of the tray's travel, and located with its lower edge on a level with the top of the properly-charged tray, all for coöperation, substantially as described, 8. In a machine for the manufacture of confectionery, the combination with a guideway through which the molding-trays are fed, of a feed-hopper above said guideway, a receptacle below said guideway, a sieve between said hopper and said guideway, a disposing-plate of triangular form overlying said guideway below the said sieve, a conveyer having transverse slats mounted to travel through said receptacle and over the face of said disposing-plate, transversely to the travel of the trays, means for effecting a continuous feed of the molding-trays through said guideway, and for driving said conveyer, and guiding-surfaces for said conveyer within said receptacle for coöperation therewith, to elevate the molding material therefrom and move the same over said disposing-plate, all substantially as and for the purposes set forth.

In testimony whereof we have hereto set our hands in the presence of the two subscribing witnesses, to wit: GEORGE SAMUEL BAKER, at London, England, the 5th day of January, 1897, and GABRIEL CARLSON, at Springfield, Massachusetts, the 14th day of June, 1897.

GABRIEL CARLSON.
GEORGE SAMUEL BAKER.

Witnesses as to signature of Gabriel Carlson:
W. F. CALLENDER,
JAS. F. WILLIAMSON.

Witnesses as to signature of George Samuel Baker:
PERCY EMA HOCKS,
WM. O. BROWN.